United States Patent
Weber et al.

[11] Patent Number: 6,065,278
[45] Date of Patent: May 23, 2000

[54] CHAIN LINK OF AN ENERGY GUIDE CHAIN WITH ADDITIONAL BODY

[75] Inventors: Willibald Weber, Netphen; Herbert Wehler, Neunkrichen, both of Germany

[73] Assignee: Kabelschlepp GmbH, Germany

[21] Appl. No.: 09/088,795

[22] PCT Filed: Nov. 19, 1996

[86] PCT No.: PCT/EP96/05097

§ 371 Date: Jun. 1, 1998

§ 102(e) Date: Jun. 1, 1998

[87] PCT Pub. No.: WO97/21048

PCT Pub. Date: Jun. 12, 1997

[30] Foreign Application Priority Data

Dec. 1, 1995 [DE] Germany .................. 195 44 931

[51] Int. Cl.[7] .................................................. F16G 13/16
[52] U.S. Cl. ................................ 59/78.1; 248/49; 248/51
[58] Field of Search ............................. 59/78.1; 248/49, 248/51

[56] References Cited

U.S. PATENT DOCUMENTS

| | | |
|---|---|---|
| 3,664,619 | 5/1972 | Heidrich et al. . |
| 5,016,841 | 5/1991 | Schumann et al. . |
| 5,020,313 | 6/1991 | Moritz et al. . |

FOREIGN PATENT DOCUMENTS

| | | | |
|---|---|---|---|
| 0124457 | 1/1981 | European Pat. Off. . | |
| 21153 | 1/1981 | European Pat. Off. ................ 59/78.1 | |
| 0021153 | 11/1984 | European Pat. Off. . | |
| 1250711 | 9/1967 | Germany . | |
| 1932428 | 1/1971 | Germany . | |
| 2020107A | 11/1971 | Germany . | |
| 1775053 | 5/1972 | Germany . | |
| 2221826 | 11/1973 | Germany . | |
| 2321633 | 4/1974 | Germany . | |
| 2357908 | 5/1975 | Germany . | |
| 2415374A | 10/1975 | Germany . | |
| 3806400A | 9/1989 | Germany . | |
| 3928236 | 10/1990 | Germany . | |
| 19544931 | 7/1996 | Germany . | |
| 982347 | 2/1965 | United Kingdom . | |
| 1216093 | 12/1970 | United Kingdom . | |

OTHER PUBLICATIONS

Gortube, "Nylatrac cable and hose carriers", 2 pages, 1985.

*Primary Examiner*—David Jones
*Attorney, Agent, or Firm*—Foley & Lardner

[57] ABSTRACT

The present invention includes a chain link for an energy guide chain for receiving cables, hoses. The chain link includes elongate side walls and transverse web portions connecting same. Each side wall has sliding surfaces for movable connection to a side portion of an adjacent chain link. The sliding surfaces, which slide against each other, of adjacent chain links are formed of a different material. At least part of the sliding surfaces is produced by an additional body, which are formed from a different material from the side wall. The additional body is attached to at least one side wall prior to assembly of the energy guide chain. The additional body is mounted to the chain link prior to and not during assembly of the energy guide chain. This operation permits the chain links to be fitted together in an uncomplicated manner and promotes automated assembly procedures.

19 Claims, 3 Drawing Sheets

CHAIN LINK OF AN ENERGY GUIDE CHAIN WITH ADDITIONAL BODY

TITLE OF THE INVENTION

The present invention concerns a chain link for an energy guide chain. In particular the area of use of the invention is in relation to chain links for an energy guide chain whose sliding surfaces, which rotate against each other, of adjacent chain links respectively comprise different materials.

BACKGROUND OF THE INVENTION

The use of different materials in chain links of an energy guide chain is known. German laid-open application (DE-OS) No. 22 21 826 describes chain elements which are suitable for manufacture by a plastic injection moulding process or a metal die casting process. In accordance with German laid-open application (DE-OS) No. 24 15 374 the outer wide sides of the projections and/or the inner wide sides of the recesses of an energy guide chain are provided with a sliding or anti-friction material. A plastic coating is referred to as advantageous in that respect. In DE 38 06 400 the side walls of a chain link are made alternately from two different thermoplastic materials which in relation to each other have lower abrasion values than pairings comprising the same respective plastic material. British patent specification No. 982 347 shows a bearing arrangement in which the surfaces which slide against each other comprise different plastic materials.

It is further known in the state of the art for an energy guide chain to be made up of multi-part chain links. DE 17 75 053 C2 for example discloses a drag chain for lines or conduits, which is formed from alternately interconnected pairs of chain plates and individual chain plates. An individual chain plate carries a ball which is so mounted in sockets in the adjacent pair of chain plates that the pair of chain plates is hingedly connected together with the individual chain plate. Arranged between the pair of chain plates and the individual chain plate at the side walls are anti-friction intermediate layers which on the one hand are intended to provide for sealing integrity of the maximum accuracy in respect of the ball bearing assembly while on the other hand they serve to hold the ball during the assembly procedure by virtue of suitable dimensioning of the opening. Also described are bushes which are carried on the longitudinal axis of the pair of chain plates and which provide a positively locking connection between the pair of chain plates and the adjacent individual chain plate.

A further publication, German patent specification No. 12 50 711, discloses a jointed-link band for energy guide chains, the bending radius of which as between the chain links is limited by interchangeable abutment portions. The bush which is illustrated therein and which surrounds a hinge pin portion affords the adjacent chain links the sliding surface on which they perform their relative movement with respect to each other. The bush is covered over by a respective lateral disc portion at the end thereof with respect to the outward sides of a chain link.

A further link chain is described in DE 23 57 908 in which disposed in mutually oppositely arranged plates of adjacent chain links are bearing shells, in which are enclosed running balls which form a rolling bearing assembly for the chain links. That rolling bearing assembly is arranged with a radius spaced from the centre point of the pivotal connection between two chain links of a link chain. The plates of two adjacent chain links are again centred by a bush, wherein two circular support discs hold together the plates of the chain links and the bush.

BRIEF SUMMARY OF THE INVENTION

Now the object of the present invention is to reduce wear and/or friction in the links or hinges of a link chain, in particular an energy guide chain, without reducing the mechanical strength of the chain links, while seeking to ensure uncomplicated assembly of the chain links.

That object is attained by a process for the production of a chain link for an energy guide chain having the features of claim 1 and by a chain link having the features of claim 10. Advantageous configurations and developments are set forth in the appendant claims. Further desirable embodiments are afforded by combinations of the features disclosed in the claims and the description.

A chain link according to the invention for an energy guide chain is distinguished in that an additional body 5; 6 is attached to at least one side wall 3 prior to assembly of the energy guide chain 1, which additional body comprises a different material from that of the side wall 3 and forms at least a part of the sliding surfaces which rotate against each other.

The invention points in a new direction in terms of the production of energy guide chains. The individual chain links are already produced separately with the sliding surfaces which later are to slide one against the other, prior to assembly of the energy guide chain. Upon assembly of the energy guide chain there is now no longer any need for at least one of two chain links which are to be connected together to be assembled. The work and resources involved upon assembling the energy guide chain from the individual finished chain links is therefore very low and therefore permits in particular an automated assembly procedure.

The additional attachment of a body to the chain link affords the possibility of producing all other components for a link-type chain such as the chain link body, side wall or transverse web portion, from only one highly-loadable material, and at the same time achieving desirable sliding and/or wearing properties by virtue of the attached body. On the one hand therefore it is possible to select a base material which is in accordance with the function to be formed by the component, without foregoing good hinge properties. On the other hand, in regard to possible subsequent disposal of the chain links, the invention affords advantageous simple separation in regard to the different materials involved. Furthermore, this design structure for a link chain facilitates interchangeability of damaged components. The body which is additionally attached to the chain link is subjected in particular to wear due to friction, in operation thereof. With a suitable design configuration it is possible for the attached body to be individually replaced. Attaching one or more bodies to a chain link affords the possibility of deliberately and specifically reducing the frictional wear which occurs in operation, and limiting it to given parts.

The production of a chain link is simplified by virtue of an advantageous design configuration for the attached body. Subsequent machining or processing to produce suitable sliding surfaces on the chain link can be saved by virtue of transferring the aspect of providing a sliding surface, to the attached body. Respectively adjacent chain links with attached body are held together for example by way of a snap-action connection. Advantageously the additionally attached body also closes the movable connection. For that purpose a part of the body can take over the function of a locking member. An advantageous embodiment of an additionally attached body is therefore a projection portion or pin with a collar. The collar performs the function of an abutment for bearing against the side wall of the chain link. At its other end which is remote from the collar, the projection portion or pin can be in the form of a snap-action closure. In principle the present invention can be applied to almost all known structural forms of energy guide chains, insofar as previously used sliding surfaces and in particular pins, bushes, slots and the like can be formed by attached bodies.

Depending on the respective purpose of use involved, hardened steel or other metal materials present themselves as materials for the additionally attached body. It is likewise also possible for the body to be produced from plastic material. Manufacture from lubricant-filled plastic material or also slip-enhancing material-filled plastic material then presents itself in regard to advantageous sliding properties. The body may equally also be entirely or partially manufactured from ceramic or also coated therewith. The choice of material in regard to the chain link is therefore not fixed and settled. It is desirable however to use a glass fibre-reinforced polyamide. That material is capable of appropriately carrying tensile forces. In addition the processing of glass fibre-reinforced polyamide to give a chain link affords many possible design configurations for the chain link. At any event the material pairing of the attached body with surfaces sliding thereon or therein should have good sliding, wearing and/or running properties.

The fitting of the additionally attached body to a chain link depends inter alia on the material of the chain link. A screw connection is possible just as it is possible for the body to be pressed into place and/or pressed on, or other connecting procedures can be employed. Force-locking and/or positively locking connections can be adopted depending on the respective assembly cost in regard to the body and the chain link and the kind of use of the energy guide chain.

Further advantages and properties of the invention are described with reference to embodiments in the following drawings. The invention is not limited to the illustrated preferred embodiments of the process and apparatus according to the invention.

DETAILED DESCRIPTION OF THE INVENTION

Figure 1:
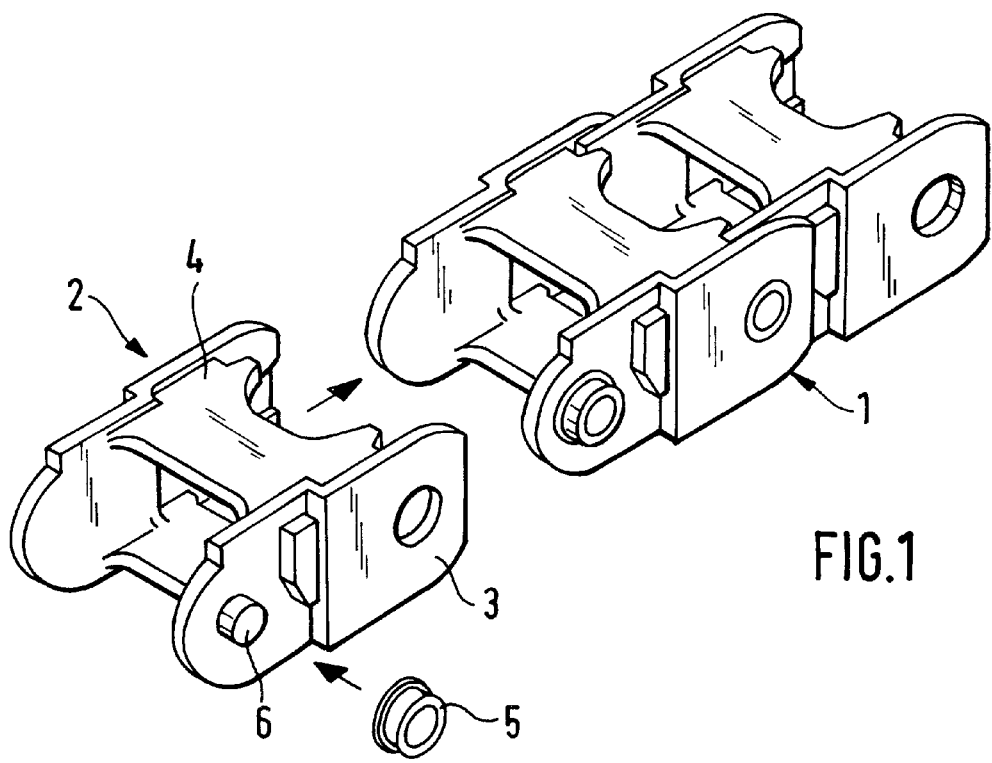
FIG. 1 shows the mounting of an additionally attached body in bush form to a chain link for an energy guide chain.

FIG. 1 shows an advantageous embodiment in which a bush 5 is fitted onto a projection portion or pin 6 on a chain link 2. The chain link 2 with additionally attached bush 5 can then be connected to another chain link 2 to form a part of an energy guide chain 1. The bush 5 which is fitted onto the pin 6 can advantageously be durably connected to the chain link 2 by virtue of a press connection. The press connection can be so designed that the bush 5 can be separated from the chain link 2 again upon subsequent disposal or replacement. The pin 6 on the chain link 2 can be produced together with the latter. If particular properties should be desired for the pin 6 in relation to the rest of the body of the chain link 2, there is the possibility of also additionally adding it to the chain link. The construction of the chain link 2 for an energy guide chain 1, comprising side walls 3 and transverse web portions 4, the features thereof and further possible design configurations, will be only briefly described hereinafter. Further details are to be found for example in German laid-open application (DE-OS) No. 1 932 428.

Figure 2:
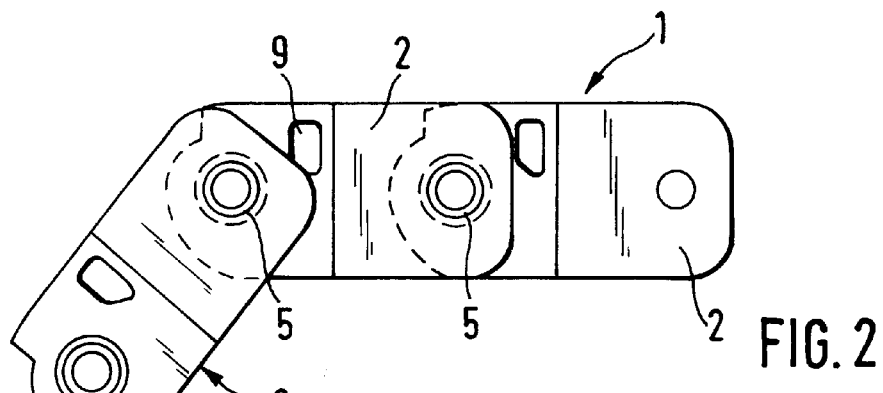
FIG. 2 is a side view of the energy guide chain in FIG. 1.

FIG. 2 shows three interconnected chain links 2 each with a respective additionally attached bush 5. One of the chain links 2 of an energy guide chain 1 is so angled that it bears with an edge of the body thereof against an abutment 9 of an adjacent chain link 2 secured thereto. Chain links 2 with additionally attached bodies enjoy the same options in regard to construction and use as other chain links 2 without such bodies.

Figure 3:
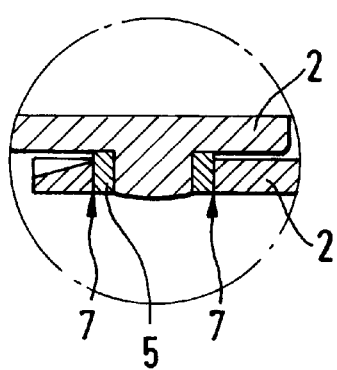
FIG. 3 is a vertical view in section through the sliding surfaces, which rotate against each other, of an interconnection of chain links shown in FIG. 1.

FIG. 3 is a vertical view in section through the sliding surfaces 7 which rotate against each other. The bush 5 is desirably so shaped that it forms a kind of spacer between the two interconnected chain links 2. The provision of sliding surfaces 7 which rotate against each other thus remains limited to a respective chain link 2 with an added body, in this case a bush 5. Wear due to friction can then also occur only at those sliding surfaces 7.

Figure 4:
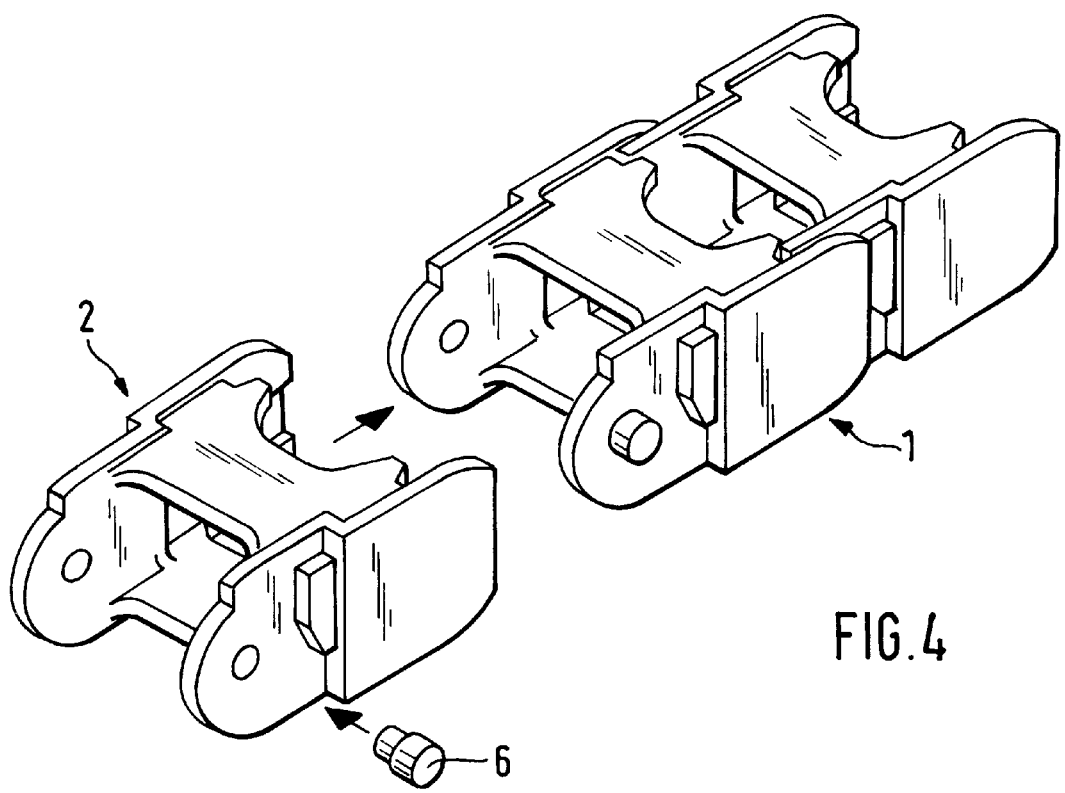
FIG. 4 shows the mounting of an additionally attached body in pin form to a chain link for an energy guide chain.

FIG. 4 shows a further particularly advantageous embodiment of a chain link with an additionally attached body. This is in the configuration of a projection portion or pin 6 which is inserted into the chain link 2. The pin 6 is of a stepped configuration. The one part of the pin 6 which provides for the connection to the chain link 2 can then be of such a configuration as to correspond to a press or screw connection. It is equally possible for the end of smaller diameter of the pin to be shaped to correspond to the function of a snap-action closure. With this advantageous configuration of a pin 6 the sliding surface which is generally more expensive to produce is limited to only a part thereof. The production of such a pin 6 using a two-plastics technology, in particular with a lubricant-filled plastic material portion for the sliding surface, would then be advantageous.

Figure 5:
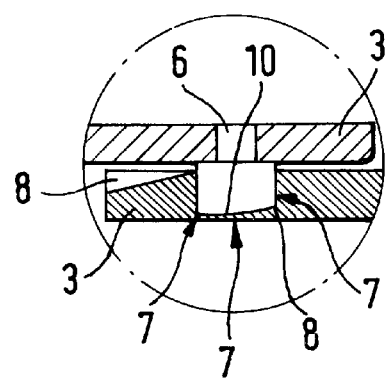
FIG. 5 is a vertical view in section through the sliding surfaces, which rotate against each other, of an interconnection of chain links as shown in FIG. 4.

FIG. 5 shows a vertical section through the sliding surfaces 7, which rotate against each other, of a connection of chain links 2 to each other as shown in FIG. 4. In this embodiment of the chain link 2 the sliding surfaces 7 which rotate against each other are shielded relative to the exterior by the side wall 3 of the chain link 2, which side wall 3 fits in snapping engagement over the pin 6. In that way it is only with difficulty that dirt, filth or liquids can gain access to the sliding surfaces 7 and increase the level of friction there. The snapping engagement of the side wall 3 over the pin 6 by expanding the side walls 3 of the chain link 2 is promoted by the provision of corresponding inclined surfaces 8 on the side wall 3 but also on the pin 6. The distance between two chain links 2 is afforded by the provision of sliding surfaces 7 which rotate against each other, as between the head of the pin 6 and the bottom 10 of the recess, receiving the pin 6, in the side wall 3 of the chain link 2 to be connected. That establishes a further degree of freedom in regard to the connection between two chain links 2.

Figure 6:
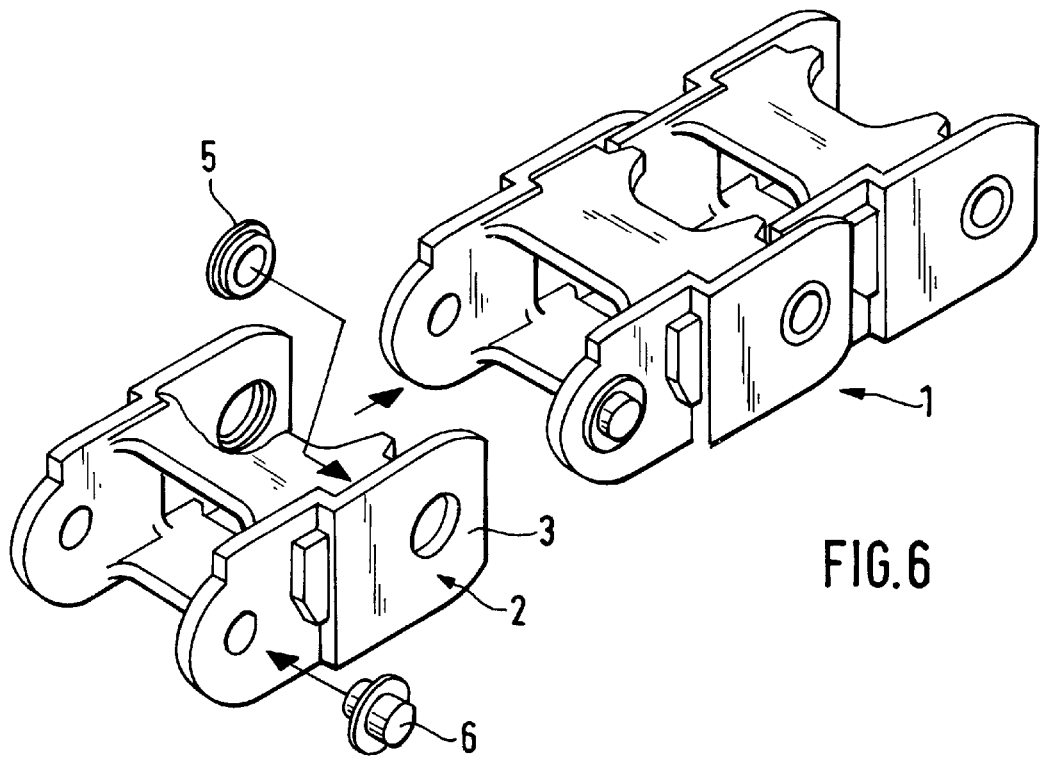
FIG. 6 shows the mounting of two additionally attached bodies in bush form and pin form respectively to a chain link for an energy guide chain.

FIG. 6 shows a further advantageous way of attaining the object of the invention. In this construction a total of four additionally attached bodies are fitted to the chain link 2 for an energy guide chain 1. The sliding surfaces which are provided between two chain links 2 are then afforded by the shapes which are selected in this case in regard to a pin 6 and a bush 5. The material of the sliding surfaces which rotate against each other can be advantageously selected in regard to the wear aspect without the material of the chain link, in regard to its frictional wear properties, exerting a decisive factor for the strength of the chain links. On the contrary the chain link can be designed in accordance with strength aspects. Interchangeability of the additionally attached bodies is promoted by the modular system of a chain link 2.

Figure 7:
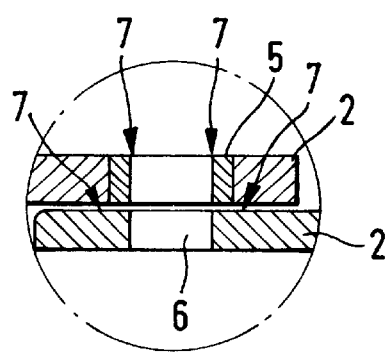
FIG. 7 is a vertical view in section through the sliding surfaces, which rotate against each other, of an interconnection of chain links as shown in FIG. 6.

FIG. 7 shows a vertical section through the sliding surfaces, which rotate against each other, of an interconnection of chain links as shown in FIG. 6. The friction between a part of the chain link 2 and the adjacent chain link 2 and/or one of the additionally attached bodies is avoided. The sliding surfaces 7 which rotate against each other are afforded solely as between the additionally attached bodies, that is to say the pin 6 and the bush 5. Those two are of such a configuration in this embodiment which is a desirable one here that they both have a step. This serves on the one hand as an abutment upon being fitted into a chain link 2 while on the other hand the spacing between the side walls 3 of the chain links 2 can be defined in that way. Abrasion of material at one of the side walls 3 as a result of friction cannot then occur.

In principle the attachment of a body to a chain link can already be implemented upon manufacture, in which case for chain links of plastic material, in particular the two-component injection moulding procedure in which two different plastic materials are processed in an injection moulding machine falls to be considered.

The attachment of an additional body to a chain link before and not during the actual operation for assembly of the energy guide chain permits chain links to be fitted together in an uncomplicated fashion and promotes automated assembly procedures.

We claim:

1. A process for preparing an energy guide chain for receiving cables, hoses from chain links having elongated side walls, transverse web portions and additional bodies, the process including the steps of
    a. producing additional bodies with a sliding surface consisting of a different material from the side wall;
    b. forming sliding surfaces, which extends perpendicular to the longitudinal direction of each side wall;
    c. attaching the additional body to at least one side wall for forming a sliding surface at said side wall; and
    d. assembling adjacent chain links for movable connection so that the sliding surfaces, which slides against each other, of the adjacent chain links each comprising a different material.

2. The process according to claim 1 wherein the additional body is produced as a pin.

3. The process according to claim 1 wherein the additional body is produced as a bush.

4. The process as recited in claim 1, wherein the attaching step includes pressing the additional body to at least one side wall.

5. The process as recited in claim 1, wherein the producing step includes the producing of the sliding surface of the additional body from a lubricant-filled plastic material.

6. The process as recited in claim 1, wherein the producing step includes the producing of the surface of the additional body from a slip-enhancing material-filled plastic material.

7. The process as recited in claim 1, wherein the producing step includes the producing of the additional body from a metal material.

8. The process as recited in claim 1, wherein the producing step includes the producing of the surface of the additional body from a ceramic material.

9. The process according to claim 1, wherein at least the side wall of the chain link is made from glass fibre-reinforced polyamide.

10. A chain link for an energy guide chain for receiving cables, hoses having two elongate side walls which are connected together by traverse web portions, and each chain side wall has a pivotal connecting portion and a receiving means therefor, the connecting portion and the receiving means have sliding surfaces, which slide against each other, of adjacent chain links, and which extends perpendicular to the longitudinal direction of each side wall wherein at least a part of the sliding surfaces is formed by an additional body which comprise a different material from the side wall and which is attached to the side wall prior to assembly of the energy guide chain.

11. The chain link according to claim 10, wherein the additionally attached body and the side wall forms a press fit.

12. The chain link according to claim 10, wherein the additionally attached body comprises a metal material.

13. The chain link according to claim 11, wherein the additionally attached body comprises a metal material.

14. The chain link according to claim 10, wherein the surface of the additionally attached body is formed from a ceramic material.

15. The chain link according to claim 11, wherein the surface of the additionally attached body is formed from a ceramic material.

16. The chain link according to claim 10, wherein the attached body itself forms at least a part of a closure means.

17. The chain link according to claim 11, wherein the attached body itself forms at least a part of a closure means.

18. The chain link according to claim 12, wherein the attached body itself forms at least a part of a closure means.

19. The chain link according to claim 14, wherein the attached body itself forms at least a part of a closure means.

* * * * *